United States Patent
Suquet et al.

(10) Patent No.: US 9,370,278 B1
(45) Date of Patent: Jun. 21, 2016

(54) PROCESSING SYSTEM FOR PREPARING SALAD

(71) Applicant: MASTRAD, S.A., Paris (FR)

(72) Inventors: Bérengère Suquet, Paris (FR); Mathieu Picchi, Paris (FR); Mathieu Lion, Paris (FR)

(73) Assignee: MASTRAD, S.A., Paris (FR)

( * ) Notice: Subject to any disclaimer, the term of this patent is extended or adjusted under 35 U.S.C. 154(b) by 102 days.

(21) Appl. No.: 14/197,054

(22) Filed: Mar. 4, 2014

(51) Int. Cl.
*B26D 7/00* (2006.01)
*A47J 43/044* (2006.01)
*A47J 44/00* (2006.01)
*A47J 43/07* (2006.01)
*A47J 43/28* (2006.01)
*A47J 43/24* (2006.01)

(52) U.S. Cl.
CPC ............ *A47J 43/044* (2013.01); *A47J 43/0711* (2013.01); *A47J 44/00* (2013.01); *A47J 43/24* (2013.01); *A47J 43/284* (2013.01)

(58) Field of Classification Search
CPC ... A47J 43/284; A47J 43/0711; A47J 43/044; A47J 43/24
USPC .............. 83/167, 471; 99/495, 479, 485, 537, 99/538; 494/60, 62, 63, 84
See application file for complete search history.

(56) References Cited

U.S. PATENT DOCUMENTS

| | | | | |
|---|---|---|---|---|
| 2,169,323 | A * | 8/1939 | Martinet | 241/92 |
| 3,783,727 | A * | 1/1974 | Brignard et al. | 83/592 |
| 5,156,084 | A * | 10/1992 | Lin | 99/495 |
| 5,735,193 | A * | 4/1998 | Chang | 99/494 |
| 5,904,090 | A * | 5/1999 | Lillelund et al. | 99/495 |
| 6,510,785 | B1 * | 1/2003 | Margolin | 99/495 |
| 6,805,032 | B2 | 10/2004 | Engdahl | |
| 7,191,691 | B2 | 3/2007 | Kaposi | |
| 7,762,169 | B2 | 7/2010 | Kaposi | |
| 7,975,605 | B2 * | 7/2011 | Wan et al. | 99/495 |
| 7,975,948 | B2 * | 7/2011 | Holcomb et al. | 241/169.1 |
| 7,992,476 | B2 | 8/2011 | Kaposi | |
| 8,353,244 | B2 * | 1/2013 | Wong | 99/495 |
| 8,402,886 | B2 * | 3/2013 | Herren | 99/510 |
| 8,635,948 | B2 * | 1/2014 | Herren | 99/537 |
| 8,667,878 | B1 * | 3/2014 | Lu | 83/856 |
| 8,695,490 | B2 * | 4/2014 | Harris et al. | 99/537 |
| 8,733,239 | B2 * | 5/2014 | Allen | 99/537 |
| D708,917 | S * | 7/2014 | Wong | D7/672 |
| 2008/0271614 | A1 * | 11/2008 | Chan | 99/537 |
| 2009/0123623 | A1 * | 5/2009 | Tweg | 426/518 |
| 2010/0071568 | A1 * | 3/2010 | Wong | 99/537 |
| 2012/0055303 | A1 | 3/2012 | Repac | |

\* cited by examiner

*Primary Examiner* — Omar Flores Sanchez
(74) *Attorney, Agent, or Firm* — Karish & Bjorgum, PC

(57) ABSTRACT

A salad processing system including a container with a processing lid thereon includes a gear with a handle driven gear wheel and pinions to provide rotary drives on the bottom side of the lid. A basket couples with one of the drives to spin-dry produce material. Another drive cooperates with a container mountable on the lid to drive chopping and mixing tools. A port through the lid allows access to the mixing container. A passageway through the lid receives a cuttings container and provides a socket for stationary blade tools including a slicer and a grid of knives. A lever pivotally mounted to the lid with a slotted plunger block dices produce through the grid of knives.

16 Claims, 10 Drawing Sheets

PROCESSING SYSTEM FOR PREPARING SALAD

BACKGROUND OF THE INVENTION

The field of the present invention is salad preparation equipment.

Mechanical devices are known for processing food items. Such devices include lettuce spinners, grid choppers, slicers, mixers and the like. Such devices when used fully to prepare a dish such as a green salad, although useful, typically require significant storage, substantial clean up and inconvenience in many kitchens, i.e., more trouble than they are worth. Green salads typically involve a number of processes which might use the devices named. It is often more convenient to prepare salads manually without benefit of several labor-saving devices. Some multifunctional devices have been employed, particularly where a variety of implements may be employed on a single drive or at a single position.

SUMMARY OF THE INVENTION

The present invention is directed to a processing system for preparing foods with coordinated elements specifically useful in the preparation of mixtures of produce such as green salads. A lid for a container includes a gear with one or more outputs for driving culinary tools. Multiple containers may also be employed with the lid.

In a first separate aspect of the present invention, the gear includes two output drives powered by a handle eccentrically engaged with a gear wheel. One drive is positioned to engage a basket for rotation to spin-dry lettuce and other produce. The second drive is engagable with a rotary tool. Such tools may include rotary cutters and mixers. The drives can be advantageously placed for best advantage and gear ratios may be selected to accommodate specific functions. A mixing container significantly smaller than the container upon which the lid may be positioned may be fastened to the lid around the second drive to provide a chamber for chopping or mixing. A port through the lid may provide convenient access to the mixing container.

In a second separate aspect of the present invention, a mixing container is attachable to the lid to receive driven rotary tools. A passageway is also provided through the lid where a cuttings container is retained. The passageway can receive a slicer and/or a grid of knives for dicing slices. A lever may be pivotally mounted to the lid to mount a plunger block for dicing.

In a further separate aspect of the present invention, any of the separate aspects and features may be combined to more advantageous affect.

Accordingly, it is an object of the present invention to provide a processing system for produce with coordinated functions. Other and further objects and advantages will appear hereinafter.

DETAILED DESCRIPTION OF THE PREFERRED EMBODIMENT

Figure 1:
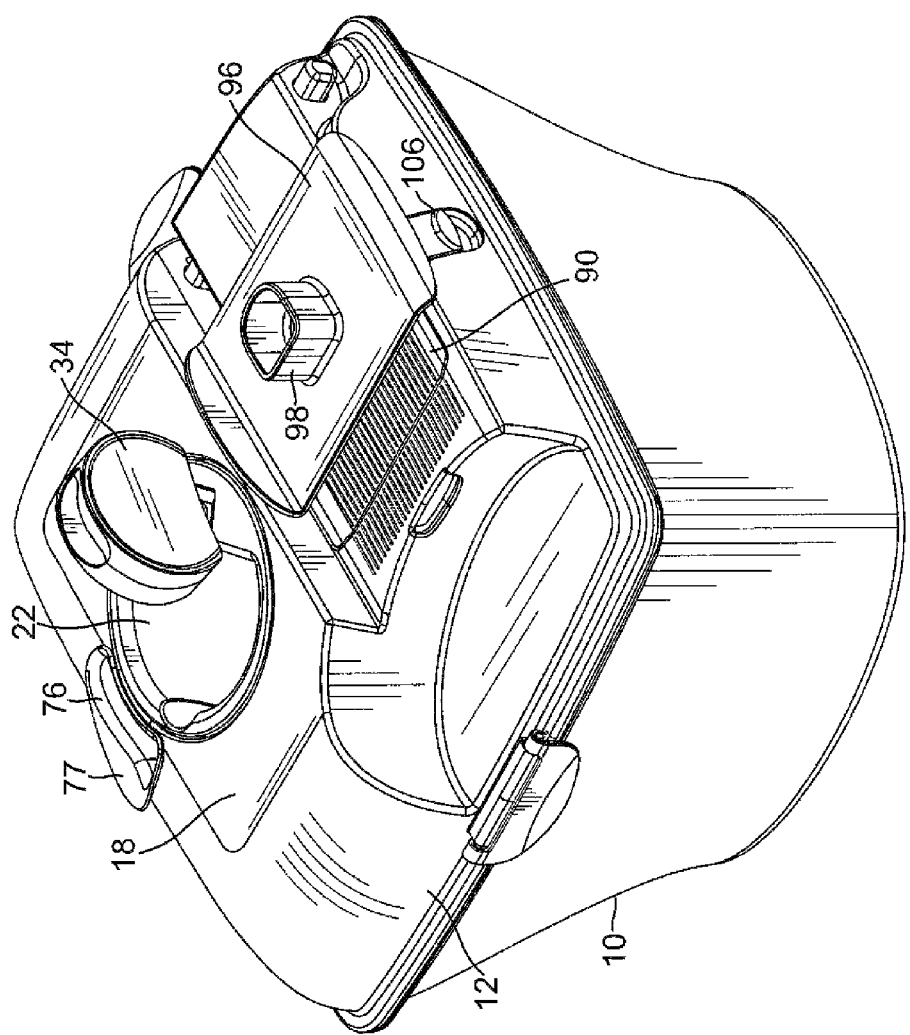
FIG. 1 is a perspective view of a processing system.

Turning in detail to the Figures, a processing system described for preparing salads in this preferred embodiment is illustrated in a first configuration. A container 10, which may also function as a salad serving bowl, supports a lid 12. The lid 12 conveniently has a flange 14 about its periphery to mate with a flange 16 on the container 10. Elements of the lid assembly may extend into the container 10 to insure retention of the lid 12. Both the container 10 and the lid 12 may be of impact resistant plastic. The container 10 may also be clear to allow observation of contents within the container 10 when the lid 12 is in place.

The top side of the lid 12 includes a raised surface 18 with a mounting cavity 20 defined therein. The mounting cavity 20 is cylindrical and receives a gear wheel 22. The gear wheel 22 is rotatably mounted in a journal bearing 24 provided in the bottom of the cavity 20. The gear wheel 22 is an internal gear wheel which provides compact gearing within the cavity 20. Two pinions 26, 28 are also rotatably mounted to the lid 12 at the bottom of the mounting cavity 20. The pinions 26, 28 are in continuous engagement with the gear wheel 22. The pinions 26, 28 in this embodiment are shown to be of the same size and, therefore, rotate at the same speed. Various pinion sizes to select gear ratios and numbers of pinions may be designed into the gear to meet positioning needs and intended use of each drive. The gear wheel 22 has a recessed hub 30 to support a central shaft 32 in the journal bearing 24. A handle 34 is located in the recessed hub 30 where it is rotatably and eccentrically coupled to the hub 30. The handle 34 may also pivot about an axis perpendicular to its rotational engagement with the recessed hub 30 so that it may lie flush with the raised surface 18.

The first pinion 26 includes a drive 36 integral with the pinion 26. The drive 36 extends to a hexagonal coupling. The hexagonal coupling is accessible from the bottom side of the lid 12 from which it extends. The second pinion 28 also extends as a second drive 38 from the bottom side of the lid 12 with a hexagonal coupling. Because of the gearing, the drives 36 and 38 rotate upon rotation of the handle 34 about the axis of the hub 30.

Figure 2:
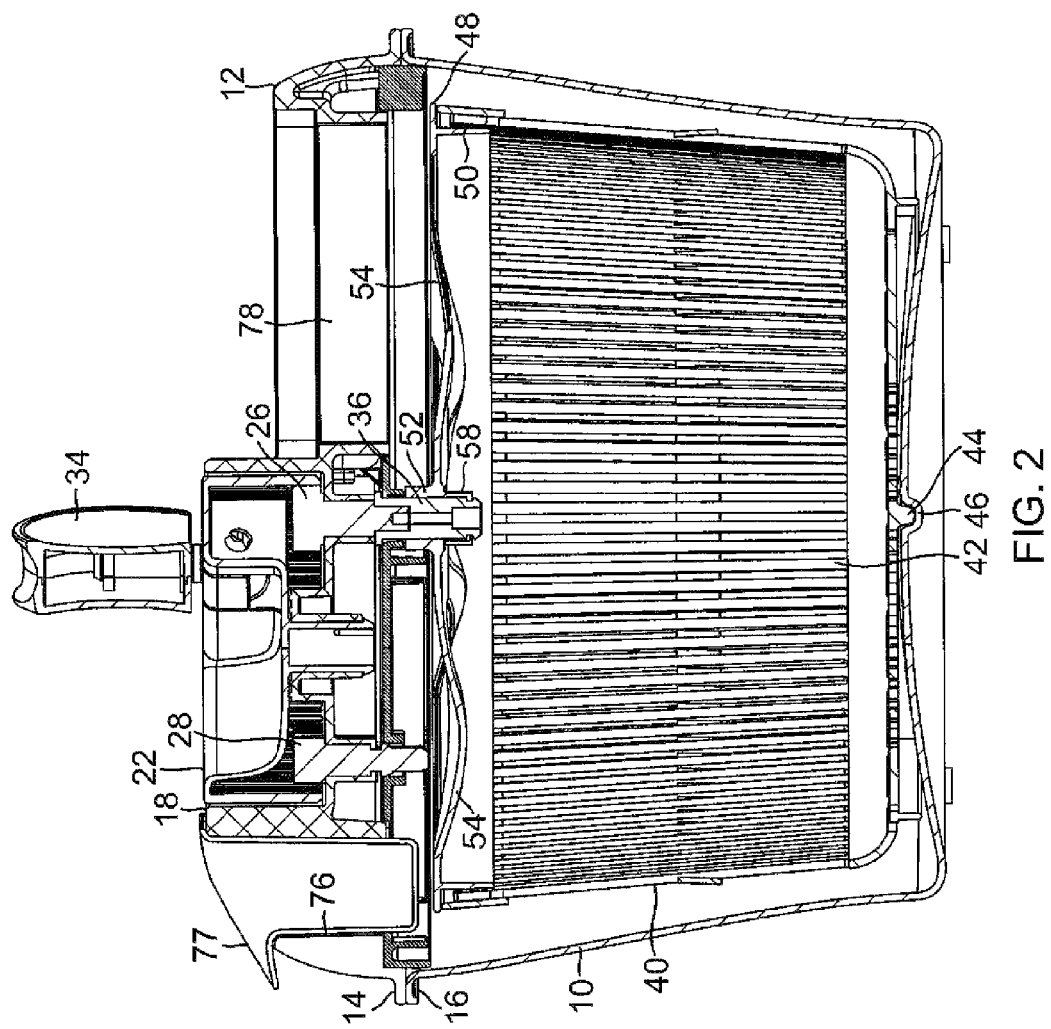
FIG. 2 is a cross-sectional view of the processing system of FIG. 1 taken through the gear axes.
Figure 3:
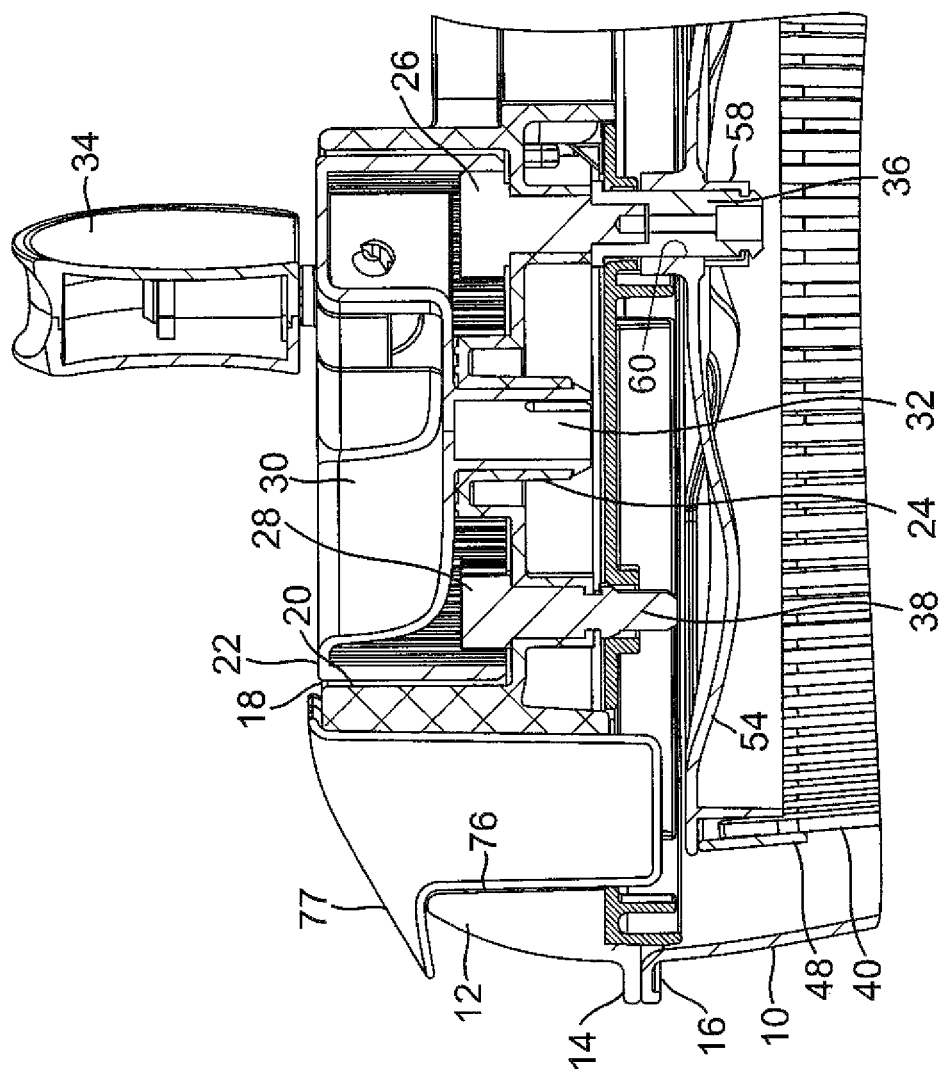
FIG. 3 is a detail view of the gear of FIG. 2.
Figure 4:
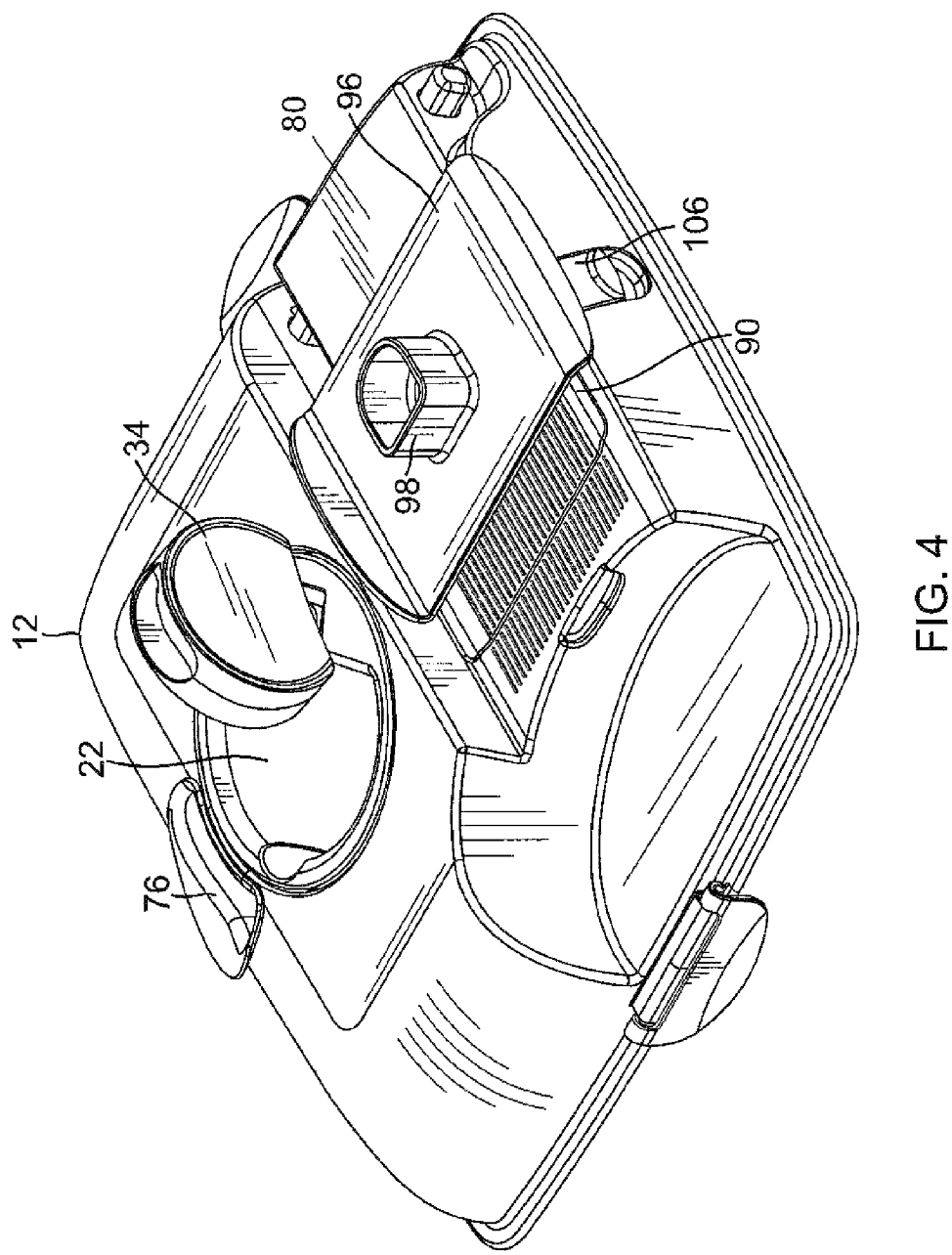
FIG. 4 is a perspective view of the processing system with a slicer attachment.

The first pinion 26 is employed to drive a basket 40. The basket 40 is designed with interstices thereabout such as the vertical slots 42 in the basket of the preferred embodiment. The basket 40 further includes a rotatable engagement with the container 10. A pin 44 centrally located on the bottom of the basket 40 extends to a cavity 46 on the inner side of the bottom of the cavity 10. The hexagonal coupling on the drive 36 is engageable with a wheel 48 seen in FIGS. 2 and 3. The wheel 48, in turn, is engaged with the periphery of the basket 40 at its upper edge. The wheel 48 includes a rim 50, a hub 52 and spokes 54 therebetween. The first drive 36 has a groove 56. The hub 52 includes axially extending fingers 58 and a socket 60. The groove 56 of the drive 36 is retained by teeth at the ends of the axially extending fingers 58 with the hexagonal coupling in the socket 60. There may be a chamfer in the engagement of the groove and the teeth of the fingers 58 to facilitate disengagement as needed. This allows the basket 40 to be easily removed from the lid 12 when spin-drying of produce is not required or has been completed. The basket 40 is designed to substantially fill the container 10 yet has areas outside the basket to collect water expelled through the slots 42 during spinning.

Figure 8:
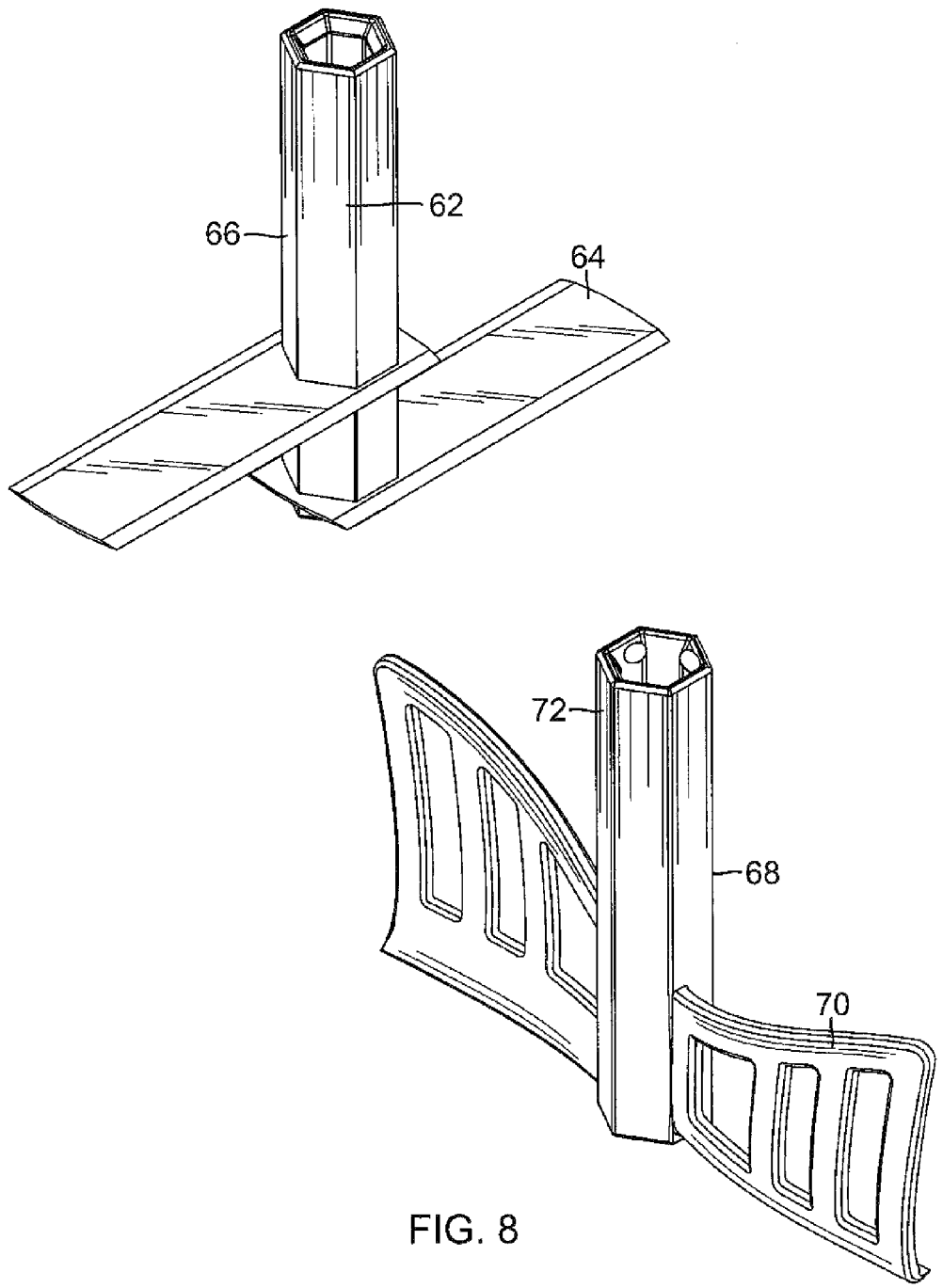
FIG. 8 is a detailed view of two rotary tools.
Figure 9:
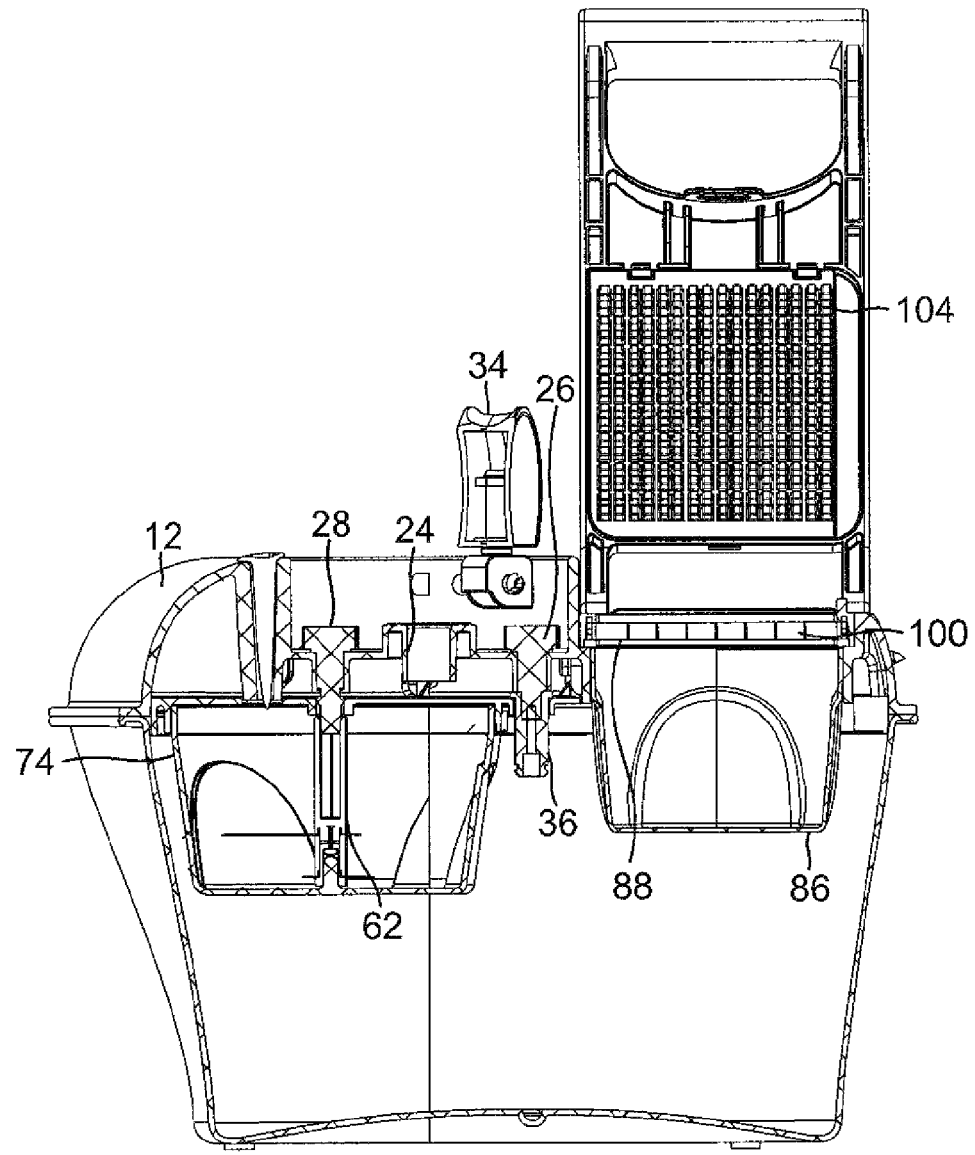
FIG. 9 is a cross-sectional view of the processing system with a dicer attachment.
Figure 10:
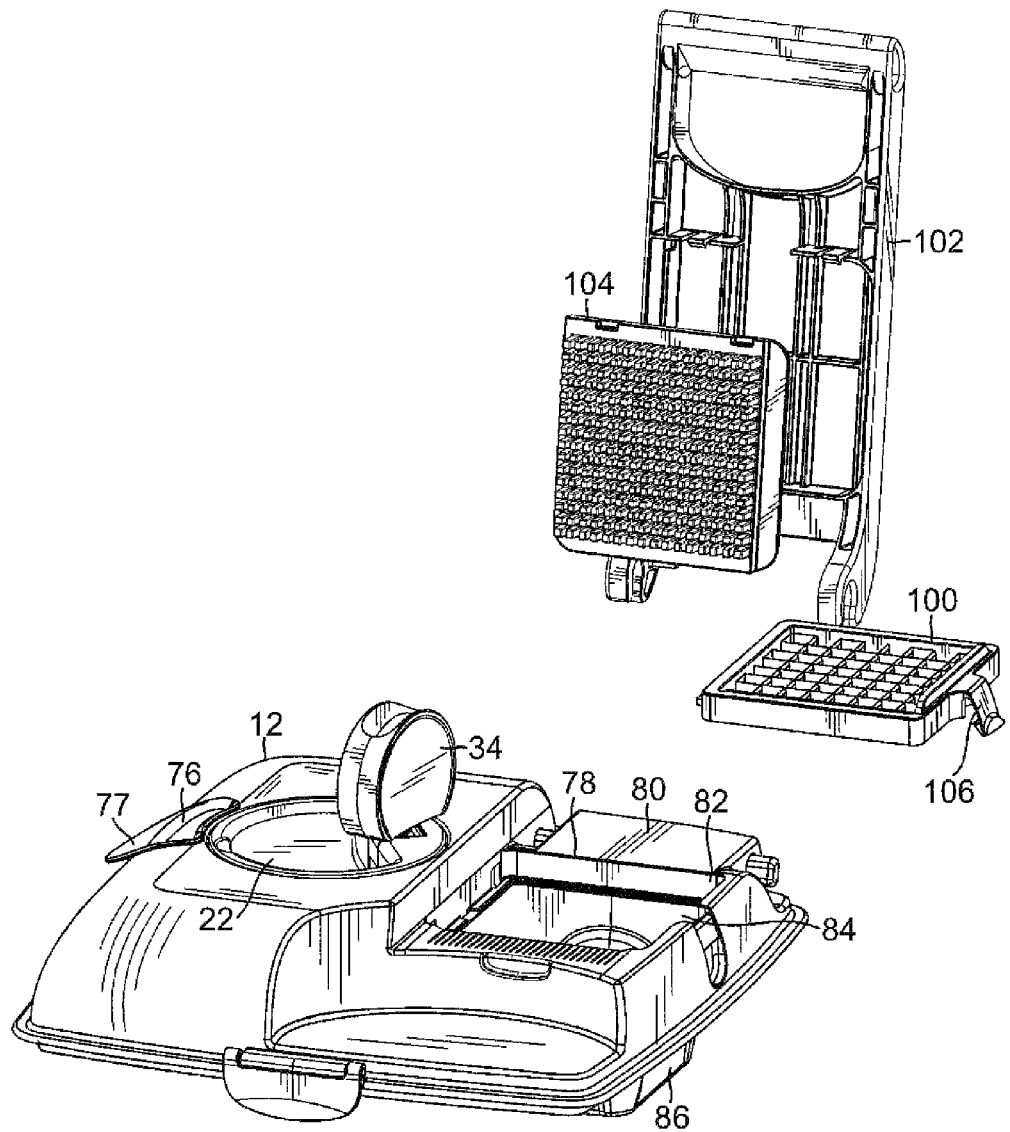
FIG. 10 is an exploded perspective assembly view of the dicer attachment.

The second drive 38 is accessible to the bottom side of the lid 12 to receive a rotary tool. Examples of such rotary tools are illustrated in FIG. 8, which include a chopping tool 62 having chopping blades 64 on a shaft 66 and a mixing tool 68 having cavitation blades 70 on a shaft 72. The shafts 66 and 72 have hexagonal sockets to releasably engage the drive 38 for use.

A mixing container 74 is attachable to the bottom side of the lid 12. This mixing container 74 concentrically receives the rotary tools employed with the second drive 38. The periphery of the mixing container is shown in this embodiment to engage with the lid 12 using bayonet engagements therebetween. Other engagements such as magnets, locking or sliding pins or a threaded coupling may be employed to releasably engage the mixing container 74. An access port 76 through the lid 12 and directed to inwardly of the periphery of the mixing container 74 provides for convenient charging of liquids such as oil and vinegar, seasonings and finely chopped ingredients. A cup 77 is formed to be positioned in the access port 76. The placement of the cup 77 in the port 76 closes the opening to keep items being chopped from flying out of the mixing container 74. Further, the cup 77 may have gradations for use as a measuring device.

The lid 12 includes the gear wheel 22 and the second drive 38 in a first region substantially to one side of the centrally mounted first pinion 26 and first drive 36. A second region of the lid 12 is positioned to the other side of the first drive 36 which includes a rectangular passageway 78 through the lid 12. This passageway 78 has a planar margin 80 thereabout. The passageway 78 also includes a rectangular socket 82 therein for tools and an inwardly extending lip 84 thereabout to receive a cuttings container 86. The cuttings container 86 includes a flange 88 about its rim for engaging the lip 84. The cuttings container 86 is placed through the passageway 78 to depend below the bottom side of the lid 12. The socket 82 may then receive a stationary cutting tool.

Figure 5:
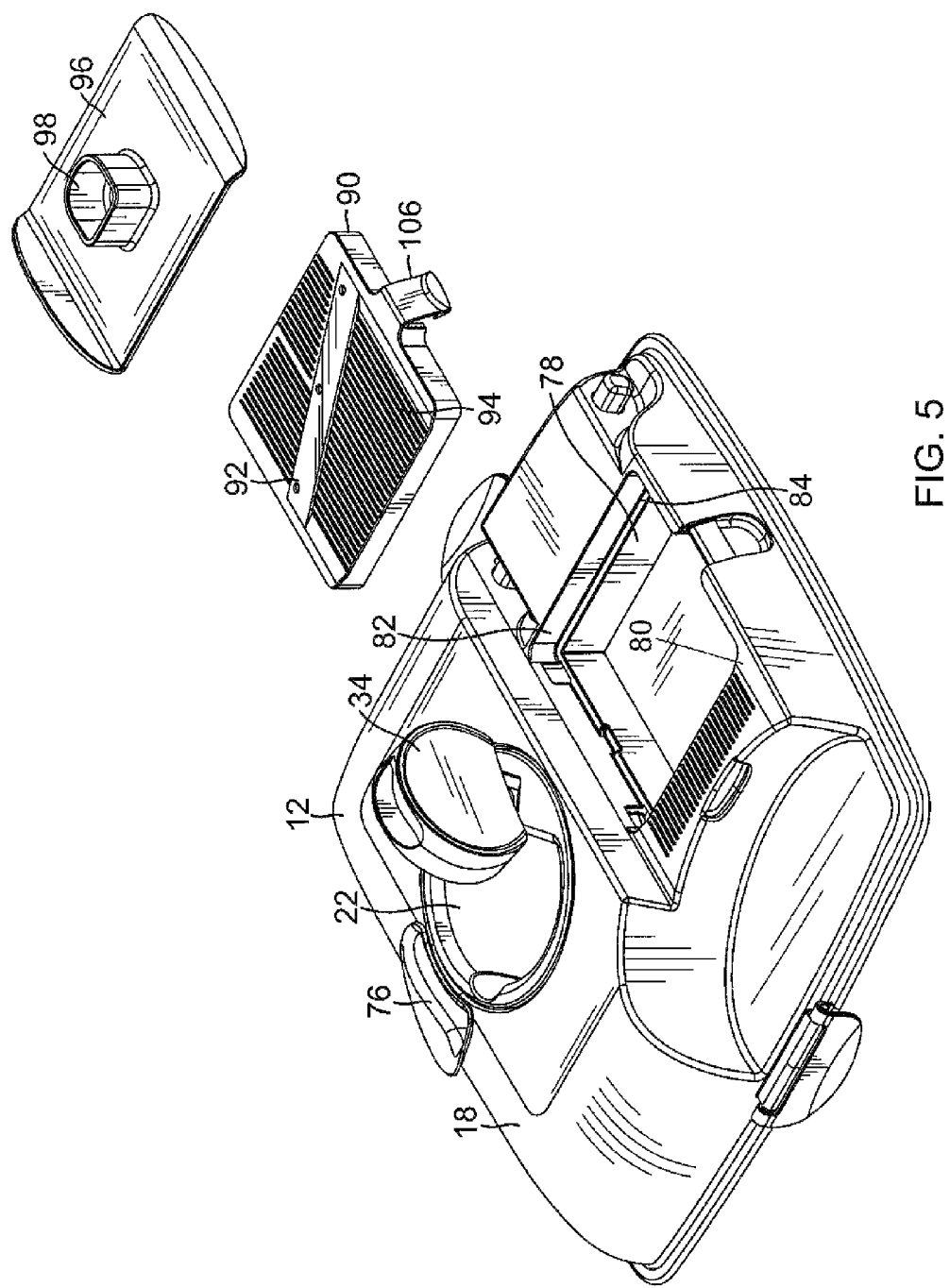
FIG. 5 is an exploded perspective view of the device of FIG. 4.
Figure 6:
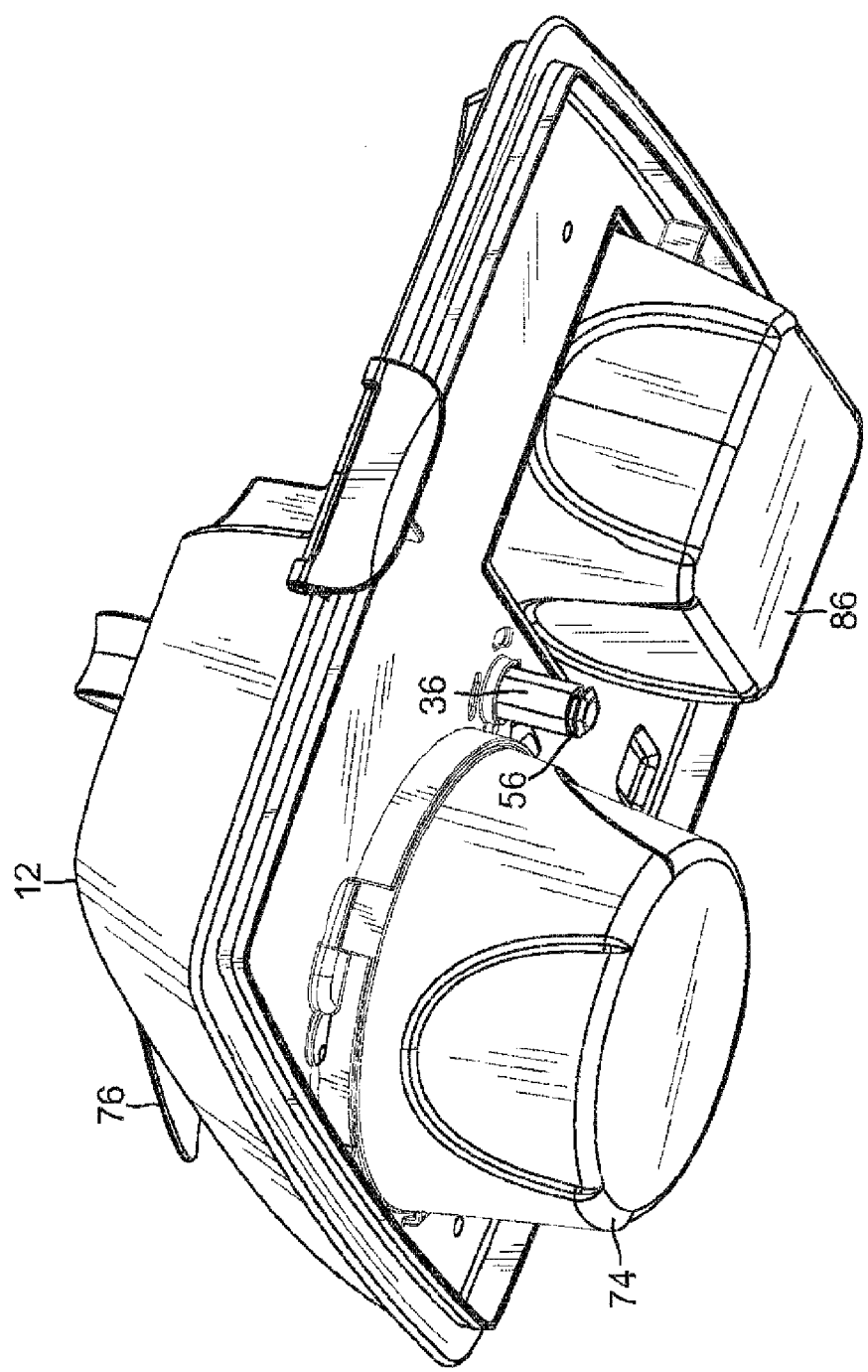
FIG. 6 is a perspective view of the underside of the lid with containers attached thereto.
Figure 7:
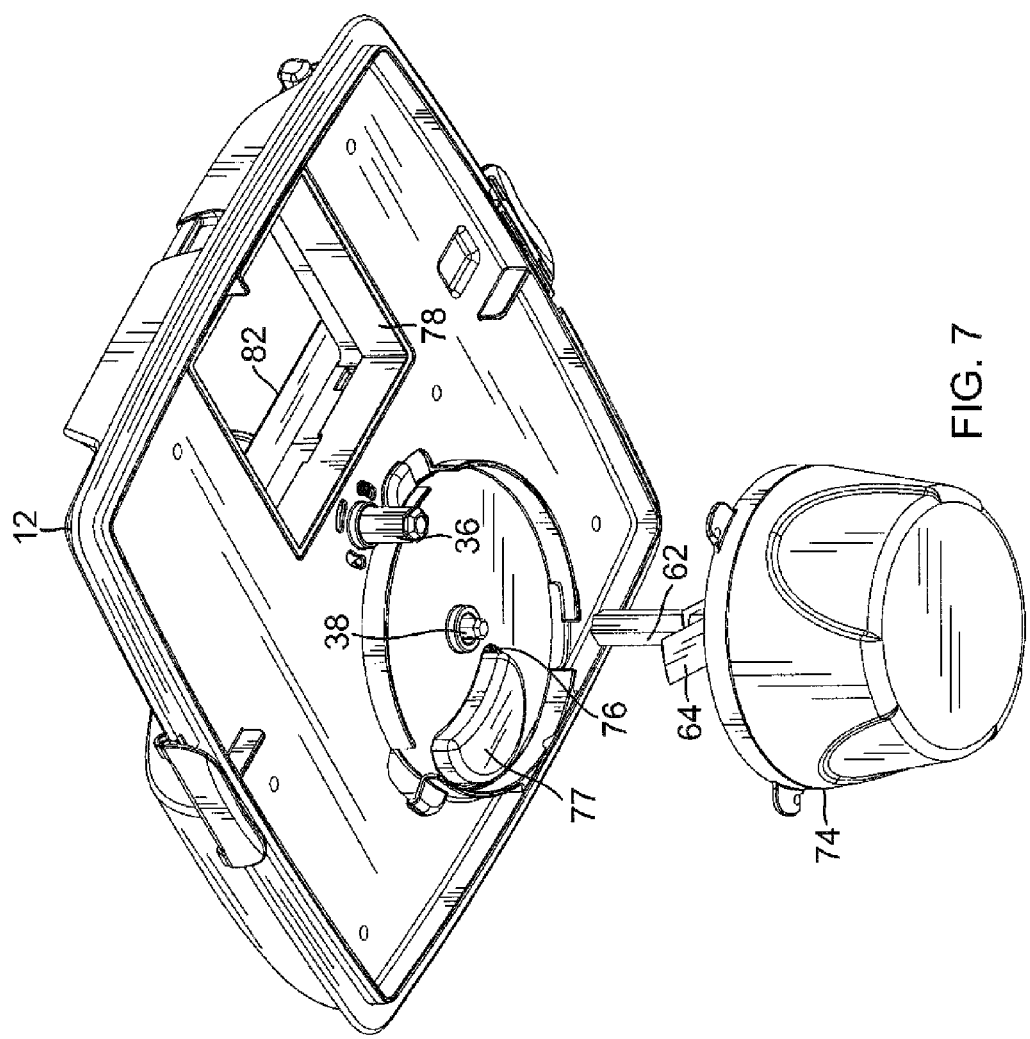
FIG. 7 is a perspective view of the underside of the lid in exploded assembly.

A slicer as illustrated in FIG. 5 is one such stationary cutting tool. The slicer 90 includes a blade 92 roughly flush with or slightly above the planar margin 80. A guide surface 94 may angle downwardly or the blade elevated to define a slicing thickness with the blade 92. Slices of produce may be created with the slicer 90 which fall into the cuttings container 86 beneath the blade. Various slicing thicknesses may be defined by a set of such slicers 90 for use when placed in the socket 82.

A guard plate 96 may also be used with the slicer 90. The guard plate 96 includes at least one runner (not shown) to cooperate with at least one track which may be the outer edge of the slicer 90 or a feature in the planar margin 80. The guard plate 96 is shown in this embodiment to include a handle 98.

With the slicer 90 and guard plate 96 removed, the cuttings container 86 can be removed and the slices of produce collected. The cuttings container 86 may be replaced if desired in the passageway 78 and a grid of knives 100 placed in the socket 82. A set of such knives may be associated with the processing system to provide various sized pieces of produce. A lever 102, pivotally mounted to the lid 12 for selective extension over the passageway 78, includes a plunger block 104 with slots therein to receive the grid of knives 100 when the lever 102 is forced down upon the lid 12. A set of such plunger blocks 104 to match the set of knife grids 100 is contemplated. Sliced produce placed on the grid of knives 100 can then be diced by manipulation of the lever 102.

To facilitate use of the stationary cutting tools, the lid 12 has a recessed area to make clearance for the handle portion of the lever 102. A clip 106 may be associated with each slicer 90 and each grid of knives 100 to engage the lid 12 so that the grid of knives 100 will not lift out of the lid 12 when the lever 102 is retracted. Further, the lever 102 may include pivot slots to engage pivot pins on the lid 12 such that the lever 102 may, when fully pivoted away from the grid of knives 100, be released from the lid 12 to allow room for other operations or for cleaning.

Thus, a reasonably contained processing system with a plurality of cooperative processing elements has been disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A processing system for preparing salad, comprising
a lid for a container, the lid having a top side and a bottom side;
a gear including a gear wheel rotatably mounted in the lid, a first pinion rotatably mounted in the lid and engaged with the gear wheel, a second pinion rotatably mounted in the lid and engaged with the gear wheel;
a first drive engaged with the first pinion and accessible from the bottom side;
a second drive engaged with the second pinion and accessible from the bottom side;
a handle on the top side rotatably and eccentrically coupled with the gear wheel;
a basket engageable with the first drive on the bottom side of the lid and defining a basket periphery;
a rotary tool engageable with the second drive on the bottom side of the lid.

2. The processing system of claim 1 further comprising
a mixing container attachable to the bottom side and defining a mixing container periphery when attached to the bottom side, the lid including an access port therethrough extending to within the defined mixing container periphery, the rotary tool extending into the mixing container.

3. The processing system of claim 2 further comprising
a cup positionable in the access port.

4. The processing system of claim 2, the lid and the mixing container having bayonet engagements therebetween.

5. The processing system of claim 1, the rotary tool being one or both of mixing blades and cutting blades.

6. The processing system of claim 1, the gear wheel being an internal gear wheel.

7. The processing system of claim 1, the first drive including a first shaft extending from the bottom side and a wheel engaging the basket about the defined basket periphery, the first shaft engaging the wheel to rotate therewith.

8. The processing system of claim 7, the first shaft having a groove thereabout, the wheel having a socket to receive the first shaft and fingers to resiliently and releasably engage the groove.

9. The processing system of claim 1 further comprising
a bowl fitting to the bottom side outwardly of the defined basket periphery, the bowl and the basket having a rotatable engagement therebetween with the basket between the bottom side and the bowl.

10. The processing system of claim 1 further comprising
a passageway through the lid;
a lever pivotally mounted to the lid to selectively extend over the passageway;
a grid of knives positionable in the passageway, the lever including a plunger block with slots to receive the grid of knives.

11. The processing system of claim 10 further comprising
a cuttings container engageable with the passageway and extending below the bottom side, the first pinion being centrally located in the lid, the gear wheel being rotatably mounted in a first region of the lid, the passageway through the lid being in a second region of the lid, the first pinion being between the first and second regions.

12. The processing system of claim 1 further comprising
a slicer including a blade and a guide defining a slicing thickness, the slicer being positionable in the passageway.

13. The processing system of claim 12 further comprising
a guard plate, the slicer further including at least one track receiving the guard plate, the guard plate slidable along the track.

14. A processing system for preparing salad, comprising
a lid for a container, the lid having a top side and a bottom side;
a gear including a gear wheel rotatably mounted in the lid, a pinion rotatably mounted in the lid and engaged with the gear wheel;
a drive engaged with the pinion and accessible from the bottom side;
a handle on the top side rotatably and eccentrically coupled with the gear wheel;
a rotary tool engageable with the drive on the bottom side of the lid, the rotary tool being one or both of mixing blades and cutting blades;
a mixing container attachable to the bottom side and defining a mixing container periphery when attached to the bottom side, the lid including an access port therethrough extending to within the defined mixing container periphery, the rotary tool extending into the mixing container;
a passageway through the lid;
a lever pivotally mounted to the lid to selectively extend over the passageway;
a grid of knives positionable in the passageway, the lever including a plunger block with slots to receive the grid of knives;
a cuttings container engageable with the passageway and extending below the bottom side, the first pinion being centrally located in the lid, the gear wheel being rotatably mounted in a first region of the lid, the passageway through the lid being in a second region of the lid, the first pinion being between the first and second regions.

15. The processing system of claim 14 further comprising
a slicer including a blade and a guide defining a slicing thickness, the slicer being positionable in the passageway with the lever, plunger and grid of knives removed.

16. The processing system of claim 15 further comprising
a guard plate, the slicer further including at least one track, the guard plate slidable along the track with the slicer positioned in the passageway.

* * * * *